United States Patent [19]
Davies

[11] Patent Number: 5,920,625
[45] Date of Patent: Jul. 6, 1999

[54] METHOD AND APPARATUS FOR TRANSMITTING AND RECEIVING ENCRYPTED SIGNALS

[75] Inventor: Donald Watts Davies, Sunbury on Thames, United Kingdom

[73] Assignee: Irdeto BV, Netherlands

[21] Appl. No.: 08/722,255

[22] PCT Filed: Sep. 29, 1994

[86] PCT No.: PCT/GB94/02116

§ 371 Date: Feb. 18, 1997

§ 102(e) Date: Feb. 18, 1997

[87] PCT Pub. No.: WO95/28057

PCT Pub. Date: Oct. 19, 1995

[30] Foreign Application Priority Data

Apr. 8, 1994 [GB] United Kingdom ............ 9407038

[51] Int. Cl.⁶ .................................................. H04N 7/167
[52] U.S. Cl. ........................................................... 380/10
[58] Field of Search .................................... 380/9, 10, 49

[56] References Cited

U.S. PATENT DOCUMENTS

| | | | |
|---|---|---|---|
| 5,003,596 | 3/1991 | Wood | 380/9 |
| 5,134,656 | 7/1992 | Kudelski | 380/16 |
| 5,164,897 | 11/1992 | Bellisio | 380/9 |

FOREIGN PATENT DOCUMENTS

| | | | |
|---|---|---|---|
| 0132401 | 1/1985 | European Pat. Off. | H04N 7/16 |
| 0428252 | 5/1991 | European Pat. Off. | H04N 7/167 |
| 0485887 | 5/1992 | European Pat. Off. | H04N 7/16 |
| 0570785 | 11/1993 | European Pat. Off. | H04N 7/16 |
| 2193867 | 2/1988 | United Kingdom | H04N 7/16 |
| WO 90/10354 | 9/1990 | WIPO | H04N 7/167 |
| WO 93/07716 | 4/1993 | WIPO | H04N 7/167 |

OTHER PUBLICATIONS

IEEE 1991 International Conference on Consumer Electronics, Jun. 5, 1991, Rosemont, Illinois, pp. 76–77, XP000288214, Digest by Jasjit S. Saini entitled *VideoCrypt—An Open Architecture Pay TV System*.

18th International Television Symposium and Technical Exhibition, May 10, 1993, Montreux, Switzerland, pp. 733–742, XP000379321, Article by Aleksander T. Futro entitled Smart Card for Conditional Access: A Marketing And Security Tool.

Veronica Satellite, No. 48, Nov 27, 1993, Hilversum, Netherlands, Extract entitled *Experiment Met De Twee Videocrypten—Leng's Multicrypt*.

Tele–Satellit, vol. 14, No. 97, Feb., 1994, Munich, Germany, p. 29, Extract entitled *Digitrona 'Advertisement—Konverter VCI–II'*.

*Primary Examiner*—David Cain
*Attorney, Agent, or Firm*—Medlen & Carroll, LLP

[57] ABSTRACT

An encrypted signal compatible with first and second encryption systems is generated by producing encryption data signals relating to each encryption system. A difference signal is derived from the two encryption data signals and the signal to be encrypted is encrypted in accordance with one of the encryption systems. At an output the encrypted signal, the two encryption signals, and the difference signal are made available. At a decoder compatible with, for example, the first encryption system, the encrypted data, the second encryption data signal, and the different signal are received. The decoder can then derive the first encryption data signal from the second encryption data signal and the difference signal and can then decode the encrypted signal.

24 Claims, 2 Drawing Sheets

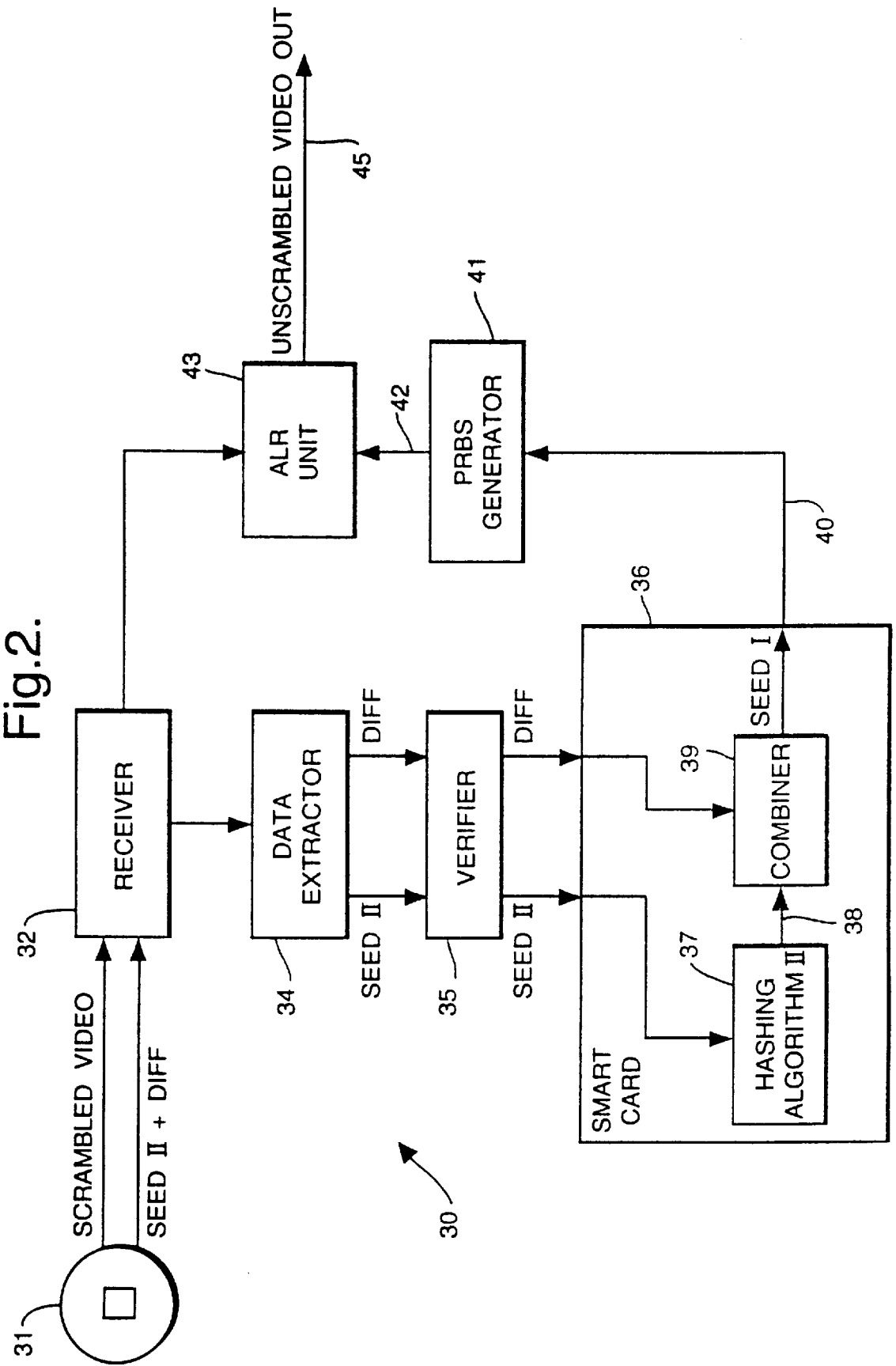

METHOD AND APPARATUS FOR TRANSMITTING AND RECEIVING ENCRYPTED SIGNALS

FIELD OF INVENTION

This invention relates to a method of and apparatus for transmitting or receiving an encrypted signal, and in particular television signals that are access controlled by being scrambled in some manner.

DESCRIPTION OF THE PRIOR ART

Access control systems have become important to, for example, satellite television broadcasters, since they enable them to limit which geographical territories a programme can be viewed in: this may be important for compliance with scheduling or copyright obligations. Also, access control enables broadcasters to ensure that only viewers with paid-up subscriptions can continue to watch the access controlled television channels. Furthermore, it enables various pay-per-view features to be implemented.

Scrambling (encrypting) television signals is a well established technique that may be used wherever those signals are meant for only a limited sub-set of potential recipients. There are a number of different approaches to scrambling. One of the better established is the 'cut & rotate' method, originally developed by Westinghouse. In 'cut & rotate', as applied to a PAL European standard television picture signal, each of the active picture lines of the 625 picture lines of a single picture frame is cut at a different point; the two segments of each line are then swapped over and the join between the two re-arranged segments smoothed over. Such a line is said to be 'scrambled'; the television broadcaster who wishes to transmit such scrambled pictures may incorporate some form of 'cut & rotate' engine or device (active line rotation unit) at the transmitting station so that the picture signals that are transmitted are scrambled. A frame of such scrambled lines can be received by a viewer's receiver, but it appears completely unintelligible unless that receiver can perform an exact inverse of the scrambling process. This would involve cutting each active picture line at the correct 'cut-point' and rotating the segments of each line so that it was re-assembled in its original, unscrambled state. The receiver needs to know where each 'cut-point' is.

If the 'cut-point' data were included with the picture signal it would (a) take up a considerable amount of transmission bandwidth and (b) would enable a pirate to design a receiver that could work out where the cut-points were, thus defeating the entire purpose of a limited access system. Therefore, cryptographic techniques are used that enable the 'cut-point' data to be generated internally from data that is transmitted with the picture signal. The data that is transmitted itself gives no clues to the 'cut-point' data.

There are a number of different cryptographic techniques that have been employed for this purpose. One such technique is described in European Patent Application No. 9030131.9 in the name of News Data Security Products Limited, which discloses a keyless cryptographic process that has become widely used in the United Kingdom as part of the VideoCrypt system. This process will be described in greater detail in a subsequent part of this specification.

This invention is not limited to any one scrambling method. In digital television audio and data signals may be included in this scrambling. For illustrative convenience the 'cut & rotate' method will be used in the examples that follow. Likewise, it is not limited to any one cryptographic process for the generation of cut points. For illustrative convenience the VideoCrypt process will be used in the examples that follow. The skilled implementer will readily envisage the application of the inventive techniques disclosed in this specification to other forms of scrambling, such as direct encryption of a digitally encoded signal, as well as other forms of cryptographic process.

Once a broadcaster has decided to use a particular cryptographic process, also commonly referred to as an 'encryption system', for a particular channel, then it is committed to using only that particular encryption system for that channel. This is because those wishing to view that channel will have bought a 'decoder' unit that can decode signals specific to that encryption system. It would be impractical to impose a new encryption system for that channel since that would require established viewers to purchase a new 'decoder' unit. Locking a broadcaster into a single encryption system may have some commercial advantages to the broadcaster, for example, if it has exclusive rights to that encryption system then other broadcasters cannot use it. Consequently, once viewers have decided to invest in a decoder unit for that encryption system, then they are unlikely to purchase a second unit to pick up another broadcaster's channels.

However, if a single scrambled channel were compatible with several systems, then broadcasters could have greater flexibility. For example, the footprint of a single channel may well cover many countries; it may be useful to be able to partition the footprint according to national boundaries by allowing different encryption systems in different countries. Also, more advanced versions of an encryption system could be used in parallel with earlier versions; this would allow the new system to be introduced without rendering older decoding equipment obsolete. Furthermore, the numbers of potential viewers would be increased to include all those with decoders compatible with all the different encryption systems supported by the single encrypted channel.

It has, until now, not been thought possible to design a secure method of, or apparatus for, transmitting or receiving signal that is compatible with more than one encryption system.

SUMMARY OF INVENTION

In accordance with one embodiment of a first aspect of the present invention, there is provided a method of transmitting a signal, compatible with a first and a second encryption system, comprising the steps of:

receiving a picture signal to be transmitted;

generating a first signal set at a first signal generator in dependence on a first data packet;

generating a second signal set at a second signal generator in dependence on a second data packet;

obtaining a difference signal from a comparison between the first and second signal sets;

scrambling the picture signal in dependence on the first signal set to generate a scrambled picture signal;

supplying for transmission the following signals, compatible with a first encryption system: [1] the scrambled picture signal, [2] the first data packet; and supplying for transmission the following signals, compatible with a second encryption system: [1] the second data packet and [2] the difference signal.

For transmissions that are compatible solely with the first encryption system, i.e. the conventional approach, only the scrambled picture signal, together with the first data packet need be transmitted. Often the first data packet will be transmitted in one set of vertical blanking intervals or 'VBI' lines. Often this data forms part of what is called the encryption data.

Typically, only a small number, perhaps eight or fewer, of such lines will carry such encryption data.

For transmissions that are compatible with the second encryption system, the second data packet is transmitted together with the difference signal. By including the difference signal, it is possible for a viewer's decoder, compatible only with the second encryption system, to work out the first signal set; it is this signal set that is needed in the viewer's decoder; it was used to scramble the picture signal and must therefore be used in the decoder to perform the inverse scrambling operation.

The difference signal may be derived from the first and second signal sets in a number of different ways. For example, if the first signal set is denoted by the number A and the second signal set by the number B, then the difference signal is the number [A−B]. This can be denoted as the number D. The second signal set can be added to this difference signal D to produce [A−B+B], which equals A, the first signal set.

The skilled implementer will conceive of many different approaches to obtaining the difference signal, not all of which require the difference signal to be the difference between two numbers, i.e. in the outcome of a subtraction process. For example, the difference signal could be obtained by an exclusive OR [i.e. XOR] operation on the first and second signal sets. Then, D =A XOR B. The second signal set may then be combined with the difference signal D by the operation D XOR B, which produces A XOR B XOR B, which equals A, the first signal set. The term 'difference signal' applies to any signal that may be utilised, in conjunction with the second signal set, to reproduce the first signal set, irrespective of the mathematical operation used to derive it.

Conveniently, a different set of VBI lines may be used to carry the encryption data compatible with the second encryption system and the difference signal. Hence, it is possible for a single channel to be scrambled according to a first encryption system, yet transmit on one set of VBI lines encryption data compatible with that first encryption system and on another set of VBI lines encryption data compatible with a second encryption system. Viewers with a decoder compatible with the first encryption system would extract data from the first set of VBI lines, whereas viewers with a decoder compatible with the second encryption system would extract data from the second set of VBI lines.

In an embodiment of a second aspect of the present invention, a method of receiving a broadcast from a transmitter, scrambled in accordance with a first encryption system, comprises the steps of:

receiving [1] a scrambled picture signal, [2] a second data packet and [3] a difference signal;

generating a signal set from [1] the second data packet and [2] the difference signal, where such a signal set is identical to a first signal set, derived in accordance with the first encryption system and used to scramble the picture signal prior to transmission by the transmitter;

unscrambling the scrambled picture signal in dependence on the signal set.

In one embodiment of each aspect, exemplified by the VideoCrypt system, the first signal set comprises seeds generated by a first hashing algorithm and cut-point data generated by using the seeds as the start values for a pseudo-random binary sequence [PRBS] generator.

This first signal set is used in the VideoCrypt I encryption system. The second signal set comprises different seeds generated by a second hashing algorithm. This second signal set is used in another encryption system, the System X system. Both systems use the same PRBS. Hence, in the first aspect, the signal generators comprise hashing algorithms, which generate seeds, and in the case of the first signal generator, also comprises a PRBS generator, which generates cut-point data from seed input. Generally, different hashing algorithms are used for each encryption system.

In such an embodiment, the seeds themselves are not transmitted. Instead, the control signals that are fed to the hashing algorithms and from which the seeds are generated are transmitted. These appear in the transmissions as a sequence of random numbers. These control signals are cryptographically related to the first and second signal sets since the first and second signal sets are formed, at least in part, from such control signals by the operation of the hashing algorithms. Commonly, different control signals will be used for each encryption system, although this is not essential.

In accordance with an embodiment of a further aspect of the present invention there is provided, an apparatus for transmitting a signal compatible with a first and a second encryption system comprising:

an input for receiving a picture signal to be transmitted;

a first signal generator to generate a first signal set in dependence on a first data packet;

a second signal generator to generate a second signal set in dependence on a second data packet;

a comparison device for obtaining a difference signal from a comparison between the first and second signal sets;

a scrambler to scramble the picture signal in dependence on the first signal set to generate a scrambled picture signal;

an output to supply for transmission the following signals, compatible with a first encryption system: [1] the scrambled picture signal, [2] the first data packet;

an output to supply for transmission the following signals, compatible with a second encryption system: [1] the second data packet and [2] the difference signal.

In a particular embodiment of such an encoder, the first and second signal generators may be incorporated, in whole or part, on separate modules that are removable from the encoder. Typically, the modules will be portable electronic devices known as smart cards. In accordance with an embodiment of a further aspect of the present invention, there is provided a smart card comprising a signal generator of such an encoder.

BRIEF DESCRIPTION OF THE DRAWINGS

The invention will now be described in detail by way of example with reference to the accompanying drawings in which:

FIG. 2 is a schematic depiction of an apparatus for receiving signals embodying the present invention.

DETAILED DESCRIPTION OF PREFERRED EMBODIMENTS

Figure 1:
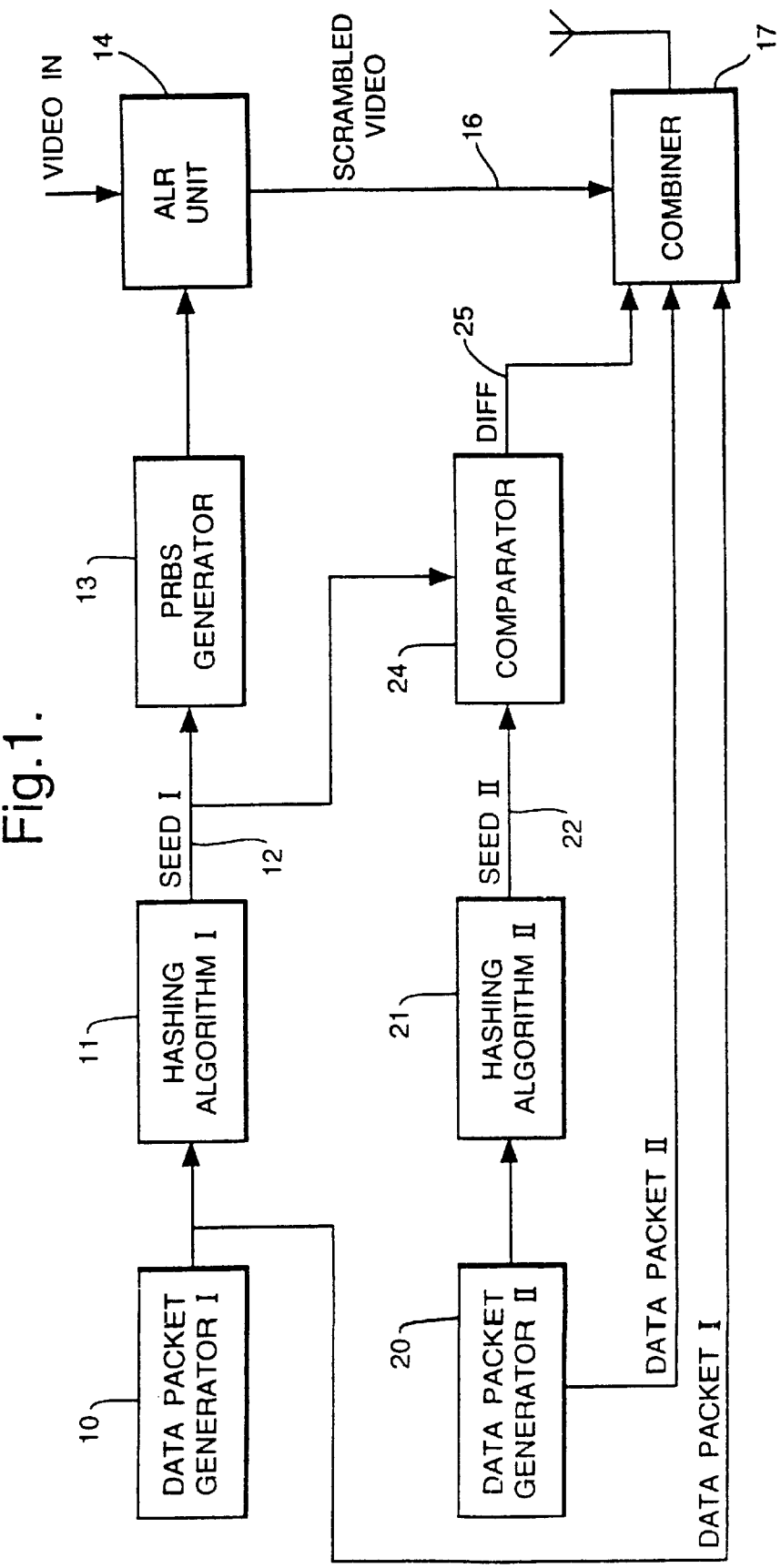
FIG. 1 is a schematic depiction of an apparatus for transmitting a signal embodying the present invention.

Reference is now made to FIG. 1, which is a schematic depiction of an apparatus for transmitting signals. In particular, FIG. 1 shows in simplified schematic form an encoder for the two encryption systems VideoCrypt I and System X. In the description scrambling is generally intended to cover the processing of analogue and digital television signals. The latter being more generally covered by the term encryption.

The VideoCrypt I system is more generally described in European Patent Application No 9030131.9 in the name of News Data Security Products Limited, to which reference should also be made. The essential differences between the system described in that earlier application and the present specification are those that enable a single scrambled channel to be unscrambled by two different encryption systems.

Returning to FIG. 1, there is shown a VideoCrypt I data packet generator 10. This data packet comprises a smart packet, seed packet and random numbers. The detailed purpose of each packet is outside of the scope of this specification. The VideoCrypt I data packet is sent to a VideoCrypt I hashing algorithm 11 which generates an output, called a seed 12. This seed is then used as a starting point for a PRBS generator 13 to generate cut points. The hashing algorithm is the most secure part of the system; it produces a given output for a given input but without any one to one relationship between the two. It is usually contained on a smart card issued to a user, rather than being integral to the encoder itself. Such an arrangement, together with the communications routes between the smart card and the other elements of the apparatus, are more fully disclosed in European Patent Application No 9030131.9.

The data packet 10 is regularly re-sent to the VideoCrypt I hashing algorithm 11 to ensure that new seeds are constantly generated. Because each data packet contains a random number sequence, each data packet will be different from the preceding data packet and, consequently, each seed 12 will be different. Typically, a new seed will be generated every few seconds or less. So a rapidly changing seed output 12 is obtained from the VideoCrypt I hashing algorithm 11.

The seeds are fed to a pseudo-random binary sequence generator 13. The PRBS 13 uses each input seed as the starting point for a random number sequence; consequently, a single seed input results in a rapidly, randomly changing sequence of output numbers. These output numbers are used to define the location of the cut points for each successive picture line of the unscrambled television signal by controlling an active line rotation unit 14 that performs the actual 'cut & rotate' scrambling on each such successive picture line of a video signal 15. The output of the active line rotation unit 14 is a scrambled picture signal 16. This is fed from the encoder for onward transmission via combiner 17.

Because new seeds are supplied every few seconds or less, the PRBS is in effect restarted every few seconds or less; this has certain advantages, such as ensuring synchronisation and that those tuning into a scrambled channel quickly get the information needed to descramble.

There is shown a System X data packet generator 20. This data packet again comprises a smart packet, seed packet, and random numbers. The System X data packet is sent to a System X hashing algorithm 21 which generates a second seed output 22. As with the VideoCrypt I data packet, the second data packet is regularly re-sent to the System X hashing algorithm 21 to ensure that new seeds are constantly generated. Again, because each data packet contains a random number sequence, each data packet will be different from the preceding data packet and, consequently, each seed will be different. Typically, a new seed 22 will be generated every few seconds or less. So a rapidly changing seed output 22 is again obtained from the System X hashing algorithm 21.

The seeds 12,22 are fed to a comparison device 24 that establishes the difference in the values of the seeds 12,22.

The output of the comparison device 24 is a difference signal 25. The difference signal may be derived from the first and second signal sets in a number of different ways. For example, if the seed 12 is denoted by the number A and the seed 22 by the number B, then the difference signal 25 is the number [A−B]. This can be denoted as the number D. The seed 38 B can be added to the difference signal D to produce [A−B+B], which equals A, the seed 12.

The skilled implementer will conceive of many different approaches to obtaining the difference signal, not all of which require the difference signal 25 to be the difference between two numbers, i.e. in the outcome of a subtraction process. For example, the difference signal 25 could be obtained by an exclusive OR [XOR] operation on the two seeds 22 and 12. Then, D=A XOR B. The seed 22 may then be combined with the difference signal 25 D by the operation D XOR B, which produces A XOR B XOR B, which equals A, i.e. seed 12. There are clearly other possibilities which will be clear to those skilled in the art.

The final stage is for the encoder to output, for broadcast, the following signals: [1] the scrambled picture signal 16 and [2] on a set of VBI (vertical blanking interval) lines allotted to the VideoCrypt I system, the VideoCrypt I data packet 10. In parallel with this, the encoder also outputs, on a different set of VBI lines allotted to the System X system: [1] System X data packet 20 and [2] the difference signal 25. This is done in combiner 17 before the signals are transmitted.

FIG. 2 is a schematic depiction of an apparatus for receiving System X signals in accordance with the present invention. This apparatus is generally supplied as a single unit, indicated generally at 30, and often referred to as an 'integral receiver/decoder' or 'IRD'. It is possible to have a separate receiver and decoder, but this embodiment is not disclosed. The System X IRD 30 is provided with the following RF signals from the parabolic dish 31 via feed 32:

[1] the scrambled picture signal 15, scrambled according to VideoCrypt I;

[2] the System X data packet 20; and

[3] the difference signal 25

The receiver 32 in the IRD 30 provides for these RF signals to be properly tuned into and then passes the System X data packet 20 and the difference signal 25 to a data extraction unit 34. The data extractor extracts and separates out the System X data packet 20 and the difference signal 25 from the scrambled video signal, passing them onto a verifier unit 35. The verifier unit 35 performs a checksum calculation to detect transmission errors and passes on the System X data packet 20 and the difference signal 25 to a smart card 36. The smart card 36 contains a System X hashing algorithm 37 that is identical to the System X hashing algorithm 21 of the smart card interfaced with the encoder. System X hashing algorithm 37 outputs seeds 38.

The smart card 36 also contains a combiner circuit 39 that performs the inverse operation to that performed by the comparison device 24 in the encoder; namely, it takes in as inputs the seed output 38 of the System X hashing algorithm 37 and the difference signal 25 and generates from them an output seed 40. The output seed 40 is identical to the VideoCrypt I seed 12. It is fed to a pseudo-random binary sequence generator 41 that is identical to the PRBS generator 13 of the encoder. Consequently, the PRBS 41 generates as output numbers cut points 42 that are exactly the same as the cut points generated in the encoder: these are fed to an active line rotation [ALR] unit 43 that is identical to the ALR in the encoder. The ALR is therefore able to cut each scrambled line, received as video input 44, at exactly the same point at which the unscrambled line was originally cut and then re-assemble the line into its original unscrambled state. The unscrambled picture signal is then output on line 45.

Clearly the system described above may be used in reverse. That is to say it may be used to decrypt a signal encrypted in System X from the first data packet and the difference signal.

The invention may also be used where transmissions to local transmitters are made in a first encryption system and then onward transmissions, eg. by cable are made with a second encryption system. At the local transmitters second data packets and a difference signal only need to be sent with the scrambled picture signal. The receivers are then able to recover seeds from the first encryption system to decode the picture.

The invention is not limited to encryption of television signals and may be used in any encryption system where security and compatibility are required.

I claim:

1. A method of transmitting a signal compatible with a first and a second encryption system, comprising the steps of:
   receiving a picture signal to be transmitted;
   generating a first signal set at a first signal generator in dependence on a first data packet;
   generating a second signal set at a second signal generator in dependence on a second data packet;
   obtaining a difference signal from a comparison between the first and second signalsets;
   encrypting the picture signal in dependence on the first signal set to generate an encrypted picture signal;
   supplying for transmission the following signals, compatible with a first encryption system: the encrypted picture signal, the first data packet; and
   supplying for transmission the following signals, compatible with a second encryption system: the second data packet and the difference signal.

2. An apparatus for transmitting a signal compatible with a first and second encryption system comprising:
   an input for receiving a picture signal to be transmitted;
   a first signal generator to generate a first signal set in dependence a first data packet;
   a second signal generator to generate a second signal set in dependence on a second data packet;
   a comparison device for obtaining a difference signal from a comparison between the first and second signal sets;
   a encrypter to encrypt the picture signal in dependence on the first signal set to generate an encrypted picture signal;
   an output to supply for transmission the following signals, compatible with a first encryption system: the encrypted rambled picture signal, the first data packet;
   an output to supply for transmission the following signals, compatible with a second encryption system: the second data packet and the difference signal.

3. The method of claim 1 wherein the first data packet is transmitted in one set of vertical blanking interval lines and the second data packet is transmitted on another set of vertical blanking interval lines.

4. The method claimed in claim 1 or 3 wherein the first signal set comprises seeds generated by a first hashing algorithm operating on the first data packet and the first signal generator comprises a hashing algorithm program, which generates the seeds.

5. The method of claim 4 wherein the second signal set comprises different seeds generated by a second hashing algorithm operating on the second data packet and the second signal generator comprises a hashing algorithm program which generates such seeds.

6. The method as claimed in claim 4 or 5 wherein the difference signal is obtained by comparing the seeds of the first and second control signal sets.

7. The apparatus of claim 2 wherein the first data packet is transmitted in one set of vertical blanking interval lines and the second data packet is transmitted on another set of vertical blanking interval lines.

8. The apparatus of claim 2 or 6 wherein the first signal set comprises seeds generated by a first hashing algorithm operating on the first data packet and the first signal generator comprises a hashing algorithm program, which generates the seeds.

9. The apparatus as claimed in claim 8 wherein the second signal set comprises different seeds generated by a second hashing algorithm operating on the second data packet and the second signal generator comprises a hashing algorithm program which generates such seeds.

10. The apparatus as claimed in claim 9 wherein the difference signal is obtained by comparing the seeds of the first and second control signal sets.

11. A smart card comprising a first and/or second signal generator of the apparatus as claimed in any of claims 2, 7 or 10.

12. A method of receiving a signal from a transmitter, encrypted in accordance with a first encryption system with a first signal set derived from a first data packet, comprising the steps of:
    receiving an encrypted picture signal, a second data packet and a difference signal related to the difference between the first and second data packets;
    generating a signal set from the second data packet and the difference signal, where such a signal set is identical to the first signal set, derived in accordance with the first encryption system and used to encrypt the picture signal prior to the transmission by the transmitter;
    decrypting the encrypted picture signal in dependence on the said signal set equipment to the first signal set.

13. An apparatus for receiving a signal from a transmitter, encrypted in accordance with a first encryption system with a first signal set derived from a first data packet, comprising:
    an input to receive an encrypted picture signal, a second data packet and a difference signal relating to the difference between the first and second data packets;
    a signal generator adapted to generate a signal set from the second data packet and the difference signal, where such a signal set matches the first signal set, derived in accordance with the first encryption system and used to encrypt the picture prior to transmission by the transmitter;
    a encrypter adapted to decrypt the encrypted picture signal in dependence on the said signal set which matches the first signal set.

14. An apparatus as claimed in claim 9 where in the signal generator comprises a hashing algorithm specific to a second encryption system such that when the second control signals are fed to such a hashing algorithm, a seed sequence is generated.

15. An apparatus as claimed in claim 12 wherein the signal generator is operable to combine the seed sequence generated by the hashing algorithm specific to the second encryption system with the difference signal to result in further seeds that are identical to a seed sequence of the first signal set, and is further operable to feed such further seeds to a pseudo-binary sequence generator to generate a cut-point sequence identical to a cut-point sequence of the first signal set.

16. A smart card comprising the signal generator of the apparatus as claimed in claim 15 wherein the signal generator is adapted to generate seeds using a hashing algorithm program and combine such seeds with the difference signal to result in further seeds that are identical to a seed sequence of the first signal set.

17. A method for encrypting a signal to be compatible with first and second encryption/decryption systems comprising the steps of:

receiving a signal to be transmitted;

generating first and second encryption data signals relating to the first and second encryption/decryption systems;

encrypting the signal in dependence on the first encryption data;

deriving a difference signal from the first and second encryption data signals; and providing at an output the encrypted signal, the first and second encryption data signals and the difference signal.

18. A method for receiving and decrypting a signal encrypted in a first encryption/decryption system comprising the steps of:

receiving the encrypted signal;

receiving encryption data relating to a second encryption/decryption system;

receiving a difference signal;

deriving encryption data relating to the first encryption/decryption system from the received encryption data and difference signal; and decrypting the encrypted signal in dependence on the thus derived encryption data.

19. Apparatus for receiving and decrypting a signal encrypted in a first encryption/decryption system comprising:

means for receiving the encrypted signal;

means for receiving encryption data relating to a second encryption/decryption system and a difference signal;

means for deriving encryption data relating to the first encryption/decryption system from the received encryption data and the difference signal; and means for decrypting the encrypted signal in dependence on the thus derived encryption data.

20. Apparatus for encrypting a signal to be compatible with first and second encryption/decryption systems comprising:

means for generating first and second encryption data signals relating to the first and second encryption/decryption systems;

means for encrypting a signal in dependence on the first encryption data signal;

means for deriving a difference signal from the first and second encryption data signals; and output means for the encrypted signal, the first and second encryption data signals and the difference signal.

21. A portable electronic device for use in apparatus for receiving and decrypting signals encrypted in a first encryption/decryption system comprising means for receiving encryption data relating to a second encryption/decryption system and for receiving a difference signal; and means for deriving encryption data relating to the first encryption/decryption system from the received encryption data and the difference signal.

22. A smart card comprising apparatus according to claim 21.

23. A smart card comprising a first and/or second signal generator of the apparatus as claimed in claim 8.

24. A smart card comprising a first and/or second signal generator of the apparatus as claimed in claim 9.

* * * * *